United States Patent
Morozini De Lira

(10) Patent No.: US 10,737,637 B2
(45) Date of Patent: Aug. 11, 2020

(54) DOOR CLADDING FOR A MOTOR VEHICLE

(71) Applicant: Dr. Ing. h.c. F. Porsche Aktiengesellschaft, Stuttgart (DE)

(72) Inventor: Adriano Morozini De Lira, Stuttgart-Vaihingen (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 0 days.

(21) Appl. No.: 16/155,915

(22) Filed: Oct. 10, 2018

(65) Prior Publication Data
US 2019/0106064 A1 Apr. 11, 2019

(30) Foreign Application Priority Data
Oct. 10, 2017 (DE) .................. 10 2017 123 488

(51) Int. Cl.
*B60R 13/02* (2006.01)
*B60N 3/02* (2006.01)
*E05B 85/10* (2014.01)
*E05B 1/00* (2006.01)

(52) U.S. Cl.
CPC .......... *B60R 13/0243* (2013.01); *B60N 3/026* (2013.01); *E05B 1/00* (2013.01); *E05B 85/10* (2013.01)

(58) Field of Classification Search
CPC .... B60N 3/026; B60R 13/0243; B60J 5/0469; B60J 5/0468; B60J 5/0456; E05B 1/00; E05B 85/10
USPC .............................................. 296/146.7, 1.09
See application file for complete search history.

(56) References Cited

U.S. PATENT DOCUMENTS

| | | | | |
|---|---|---|---|---|
| 3,566,436 A * | 3/1971 | Marks et al. | .......... | A45C 13/26 16/405 |
| 4,021,072 A * | 5/1977 | Belanger | ................ | B60N 3/026 296/71 |
| 4,404,709 A * | 9/1983 | Janz | ....................... | B60N 3/026 16/422 |
| 4,794,668 A * | 1/1989 | Lorence | ................. | B60N 3/026 16/110.1 |
| 5,259,089 A * | 11/1993 | Baur | ...................... | A45C 13/26 16/444 |
| 5,285,551 A * | 2/1994 | Weiland | ................. | B60N 3/026 16/430 |
| 6,668,424 B1 * | 12/2003 | Allen | ..................... | B60N 3/026 16/436 |
| 2011/0025083 A1 * | 2/2011 | Gupta | ................... | B60N 3/026 296/1.02 |

FOREIGN PATENT DOCUMENTS

| | | |
|---|---|---|
| DE | 10 2004 023 396 | 12/2005 |
| DE | 10 2008 039 962 | 3/2010 |
| DE | 10 2013 109 615 | 3/2015 |
| FR | 2 932 444 | 12/2009 |

* cited by examiner

*Primary Examiner* — Jason S Morrow
(74) *Attorney, Agent, or Firm* — Gerald E. Hespos; Michael J. Porco; Matthew T. Hespos

(57) ABSTRACT

A door cladding for a motor vehicle has a base body, a door handle (100), a cover (101) and at least one securing component (102). The door handle (100) is fastened on the base body, and the cover (101) at least partially encases the door handle (100). The securing component (102) is fastened on the base body and is formed in one part and/or integrally with the cover (101).

14 Claims, 2 Drawing Sheets

DOOR CLADDING FOR A MOTOR VEHICLE

CROSS REFERENCE TO RELATED APPLICATION

This application claims priority under 35 USC 119 to German Patent Appl. No. 10 2017 123 488.8 filed on Oct. 10, 2017, the entire disclosure of which is incorporated herein by reference.

BACKGROUND

Field of the Invention

The invention relates to a door cladding for a motor vehicle.

Description of the Related Art

The prior art discloses door claddings which comprise a base body and a door handle fastened thereon. Known door handles are at least partially encased by a cover to achieve a better feel and a better appearance of the door handle. This cover means is frequently made of leather.

DE 10 2013 109 615 A1 discloses a door cladding in which the door handle is additionally fastened on the base body by an arrester strap. In the event of a lateral pole impact of the motor vehicle, this is intended to prevent a situation in which, as a result of a strong deformation of the base body, the door handle is detached from the base body.

Against this background, the object on which the present invention is based is to reduce the manufacturing outlay for a door cladding having a securing means. In addition, it is intended for a motor vehicle having such a door cladding to be provided.

SUMMARY

The door cladding comprises a base body, a door handle, a cover and a securing means. The base body within the context of this description is a component on which plural other components are fastened. The base body can be the component of the door cladding with the greatest volume and/or with the greatest mass.

The door handle is fastened on the base body. The cover encases the door handle at least partially. For example, the cover can be made of a soft, in particular fabric-like, plastic or leather. The door handle can be made for example of a hard, in particular nondeformable, plastic or of a metal. The securing means is fastened on the base body and is formed in one part and/or integrally with the cover.

The terms "one part" or "unitary" as used herein mean that the securing means and the cover are produced from a single part. The securing means and the cover thus have not been fastened to one another, but are produced directly as a single component. By contrast, the term "integral" as used herein means that the cover and the securing means are two components that are nonreleasably connected to one another. For example, the cover means and the securing means can be stitched, adhesively bonded and/or welded to one another. Here, a feature of the nonreleasable connection is that the cover and the securing means cannot be separated from one another and subsequently be connected to one another again without further aids.

By virtue of the one-part or unitary nature and/or the integral nature, the securing means is adapted visually to the cover and also has similar properties in terms of feel. In the case of the cover, care customarily is taken to ensure that the appearance and the feel are particularly advantageous. These advantages thus also apply to the securing means.

According to one embodiment of the invention, the securing means can be designed as an arrester strap. An arrester strap within the context of this description is a strap-like flexible component via which the cover is connected to the base body. In the event of the motor vehicle being involved in an accident, the arrester strap remains intact and prevents an uncontrolled movement of the cover, and of the door handle fastened thereon, in the interior of the motor vehicle.

According to one embodiment of the invention, the securing means can be arranged on one end of the cover. In this context, the end is a region that terminates the cover and that encases the door handle.

The securing means can comprise two securing elements, each of which is arranged on one end of the cover. The cover thus has two ends. A securing element is arranged on each of these ends. As a result, the safety is increased still further.

The door cladding can have a stud that projects from the base body and on which the securing means is fastened. This is a particularly secure fastening of the securing means on the base body.

The door handle can be fastened on the base body without using the stud. The stud thus is designed exclusively for fastening the securing means on the base body, with the result that fewer forces act thereon in the event of an accident.

The door handle can be fastened on the stud. The stud thus has two functions, namely as a fastening stud for the door handle and for the securing means. Consequently, the production outlay is reduced.

The cover and the securing means can consist of the same material. This is particularly advantageous for reasons of appearance and of feel.

The material can be leather. Leather is perceived by many users to be particularly advantageous in terms of appearance and feel.

Further features and advantages of the present invention will become clear from the following description of preferred exemplary embodiments with reference to the appended drawings. Here, the same reference signs are used for identical or similar components and for components with identical or similar functions.

DETAILED DESCRIPTION

Figure 1:
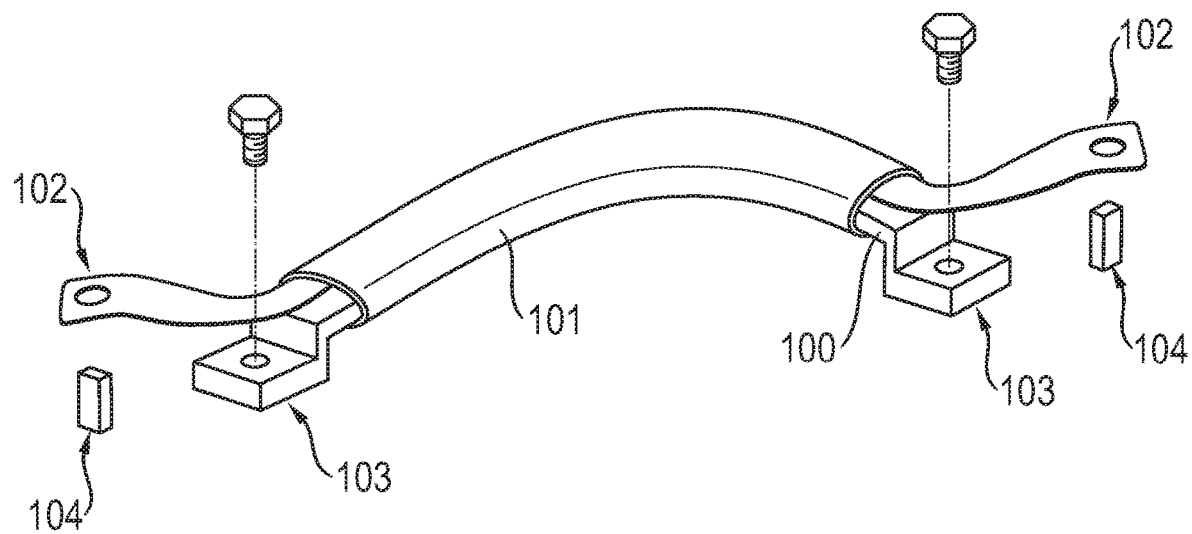
FIG. 1 is a schematic perspective illustration of a door handle having a cover means and a securing means.
Figure 2:
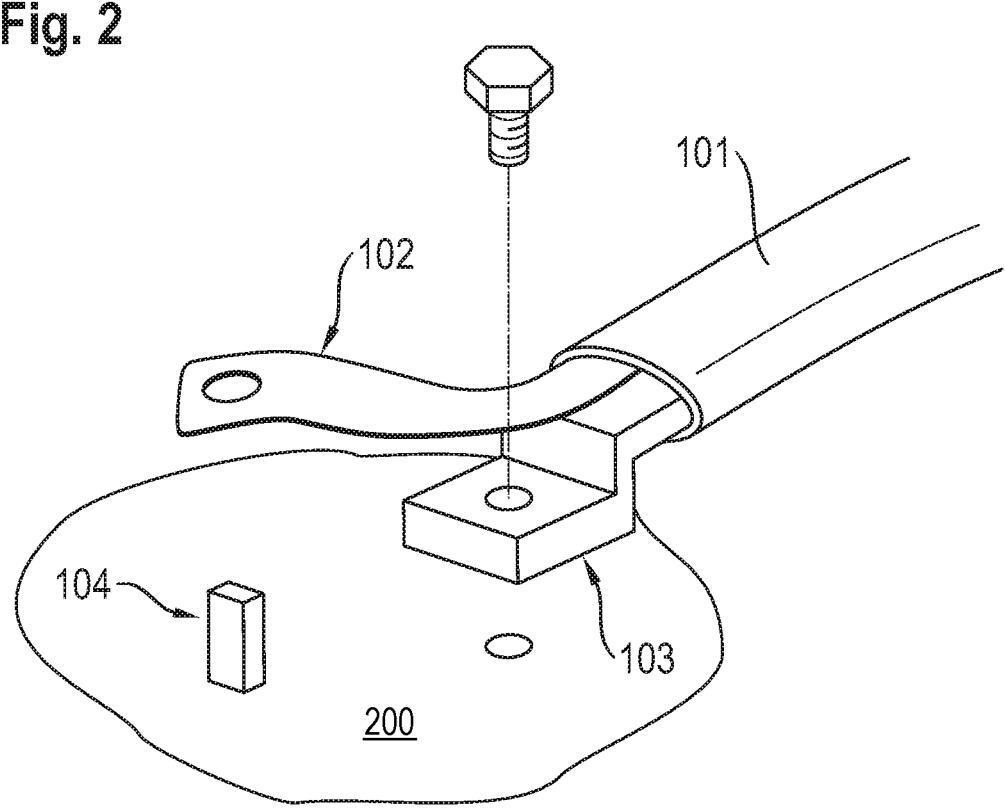
FIG. 2 is an enlarged schematic perspective illustration of a detail from FIG. 1.
Figure 2:
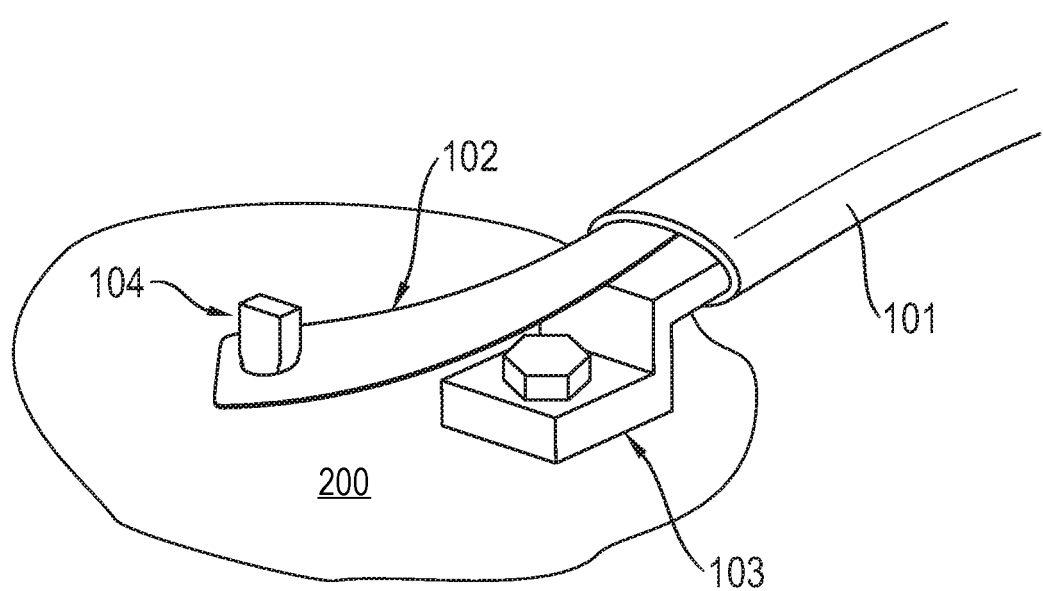

FIG. 1 shows a door handle 100 is encased by a cover 101. The cover 101 is formed in one part or integrally with two securing elements 102 that together form a securing means. The door handle can be fastened to a base body 200 by fastening elements 103. The securing elements 102 have apertures by means of which the securing elements 102 can be fastened on a stud 104 projecting from the base body 200.

If the base body 200 on which the door handle 100 is fastened is deformed in the event of an accident of the motor vehicle, and the door handle 100 is detached from the base body, the securing elements 102 function as arrester straps. They prevent the door handle 100 from flying around in the interior of the passenger compartment in an uncontrolled manner and potentially injuring passengers.

The one-part or integral design of the securing elements 102 with the cover means 101 is advantageous for a particularly pleasant feel and appearance. In addition, the securing elements are thus fastened particularly well on the cover means 101 and can thus fix the door handle 100 particularly well.

What is claimed is:

1. A door cladding for a motor vehicle that has a door with a base body and a door handle secured to the base body at one or more handle attachment locations, wherein the door cladding comprises: a cover that at least partially encases the door handle, and at least one securing element projecting from the cover and configured for being secured on the base body at one or more securing locations spaced from the one or more attachment locations of the door handle to the base body, the at least one securing element being formed in one part and/or integrally with the cover.

2. The door cladding of claim 1, wherein the at least one securing element is an arrester strap.

3. The door cladding of claim 1, wherein the at least one securing element is arranged on one end of the cover.

4. The door cladding of claim 1, wherein the at least one securing element comprises two securing elements arranged respectively on opposite ends of the cover.

5. The door cladding of claim 1, further comprising a stud that projects from the base body and on which the securing element is fastened.

6. The door cladding of claim 5, wherein the door handle is fastened on the base body at a location spaced from the stud.

7. The door cladding of claim 1, wherein the cover and the securing element consist of the same material.

8. The door cladding of claim 7, wherein the material is leather.

9. A motor vehicle, comprising the door cladding of claim 1 and a door, wherein the door cladding is arranged on the door.

10. A motor vehicle door comprising:
a base body;
a door handle secured to the base body at one or more handle attachment locations; and
a door cladding, the door cladding comprising: a cover that at least partially encases the door handle, and at least one securing element projecting integrally from the cover and being secured on the base body at one or more securing locations spaced from the one or more attachment locations of the door handle to the base body.

11. The motor vehicle door of claim 10, wherein the base body includes at least one stud projecting from the base body, the at least one securing element being secured on the at least one stud.

12. The motor vehicle door of claim 10, wherein the door handle has first and second fastening elements formed respectively at opposite first and second ends of the door handle, the cover of the door cladding surrounding areas of the door handle spaced inward from the first and second fastening elements, the at least one securing element comprises first and second securing elements extending from opposite first and second ends of the cover, the first and second fastening elements of the door cladding being secured to the base body of the motor vehicle door at locations spaced from the first and second fastening elements of the door handle.

13. The motor vehicle door of claim 10 wherein the door cladding is formed of leather.

14. The motor vehicle door of claim 10, wherein the door handle is formed from metal or plastic.

\* \* \* \* \*